United States Patent
Rathineswaran et al.

(10) Patent No.: US 10,609,013 B2
(45) Date of Patent: Mar. 31, 2020

(54) TWIN FACTOR AUTHENTICATION FOR CONTROLLER

(71) Applicant: American Megatrends International, LLC, Norcross, GA (US)

(72) Inventors: Chandrasekar Rathineswaran, Cumming, GA (US); Joseprabu Inbaraj, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 49 days.

(21) Appl. No.: 15/709,683

(22) Filed: Sep. 20, 2017

(65) Prior Publication Data

US 2019/0089688 A1    Mar. 21, 2019

(51) Int. Cl.
*H04L 9/00* (2006.01)
*H04L 29/06* (2006.01)

(52) U.S. Cl.
CPC .......... *H04L 63/08* (2013.01); *H04L 63/105* (2013.01); *H04L 63/123* (2013.01); *H04L 2463/082* (2013.01)

(58) Field of Classification Search
CPC ....................................................... H04L 63/08
USPC ............................................................ 726/4
See application file for complete search history.

(56) References Cited

U.S. PATENT DOCUMENTS

| | | | |
|---|---|---|---|
| 8,108,498 B2* | 1/2012 | Kunchipudi | G06F 9/4416 709/217 |
| 8,434,133 B2* | 4/2013 | Kulkarni | G06F 21/33 726/4 |
| 8,930,498 B2* | 1/2015 | Votaw | G06Q 20/3221 709/219 |
| 9,906,520 B2* | 2/2018 | Fouad | H04L 63/083 |
| 10,148,433 B1* | 12/2018 | Lozin | H04L 9/0825 |
| 2017/0201518 A1* | 7/2017 | Holmqvist | G06F 21/40 |

* cited by examiner

*Primary Examiner* — Christopher J Brown
(74) *Attorney, Agent, or Firm* — Locke Lord LLP; Tim Tingkang Xia, Esq.

(57) ABSTRACT

Systems and methods for twin factor authentication, which may be applied to a controller, such as a baseboard management controller (BMC). The controller provides a service. When a first user attempts to access the service, the controller receives an access message for a first user to access the service, and searches for information of the first user and a second user corresponding to the first user based on the access message. Then the controller sends two security clearance requests based on the information of the first user and the second user, including a first security clearance request for security clearance from the first user, and a second security clearance request for security clearance from the second user. The twin factor authentication for the first user would be successful only when the controller receives security clearance from both the first user and the second user.

14 Claims, 5 Drawing Sheets

TWIN FACTOR AUTHENTICATION FOR CONTROLLER

FIELD

The present disclosure relates generally to authentication technology, and more particularly to systems and methods for twin factor authentication for a controller, such as a baseboard management controller (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Authentication technology is commonly used as a security measurement for computer systems. For example, in a client-server system, a user at a client computer must pass the authentication process to access the services provided by the server. In some cases, the authentication process may be further enhanced by using multiple factors or steps of authentication. For example, in a two-factor authentication process, the user must pass the two authentication steps of the process. Each authentication factor (or step) may involve a separate authentication mechanism that the user must be successfully authenticated, such that the user may pass the whole two-factor authentication process. However, the two-factor authentication process limits the authentication only to the actual user.

Therefore, an unaddressed need exists in the art to address the aforementioned deficiencies and inadequacies.

SUMMARY

Certain aspects of the disclosure direct to a system, which includes a controller including a processor and a memory storing computer executable code. The computer executable code, when executed at the processor, is configured to: provide a service; receive an access message for a first user to access the service; and in response to the access message, perform twin factor authentication for the first user by: based on the access message, searching for information of the first user and a second user corresponding to the first user; sending two security clearance requests based on the information of the first user and the second user, wherein the two security clearance requests comprise a first security clearance request for security clearance from the first user, and a second security clearance request for security clearance from the second user; and determining the twin factor authentication for the first user to be successful only in response to receiving security clearance respectively from both the first user and the second user.

Certain aspects of the disclosure direct to a method for performing twin factor authentication, which includes: providing a service on a controller; receiving, by the controller, an access message for a first user to access the service; and in response to the access message, performing, by the controller, the twin factor authentication for the first user by: based on the access message, searching for information of the first user and a second user corresponding to the first user; and sending two security clearance requests based on the information of the first user and the second user, wherein the two security clearance requests comprise a first security clearance request for security clearance from the first user, and a second security clearance request for security clearance from the second user; wherein the twin factor authentication for the first user is successful only in response to receiving security clearance respectively from both the first user and the second user.

Certain aspects of the disclosure direct to a non-transitory computer readable medium storing computer executable code. In certain embodiments, the computer executable code, when executed at a processor of a controller, is configured to: provide a service; receive an access message for a first user to access the service; and in response to the access message, perform twin factor authentication for the first user by: based on the access message, searching for information of the first user and a second user corresponding to the first user; sending two security clearance requests based on the information of the first user and the second user, wherein the two security clearance requests comprise a first security clearance request for security clearance from the first user, and a second security clearance request for security clearance from the second user; and determining the twin factor authentication for the first user to be successful only in response to receiving security clearance respectively from both the first user and the second user.

In certain embodiments, the controller is a baseboard management controller (BMC).

In certain embodiments, the system further includes a computing device communicatively connected to the controller via a network, wherein the access message is received by the controller from the computing device.

In certain embodiments, the second security clearance request includes: the information of the first user; and a security clearance instruction to the second user for approving the first user to access the service.

In certain embodiments, the information of the second user corresponding to the first user includes: transmission information of the second security clearance request; and security clearance information for security clearance from the second user.

In certain embodiments, the transmission information of the second security clearance request defines a transmission method and a destination for sending the second security clearance request to the second user.

In certain embodiments, the transmission method for sending the second security clearance request to the second user includes: an email service; an instant messenger service; and a cell phone short message service (SMS).

In certain embodiments, the first user has a lower privilege level to access the service, and the second user has a higher privilege level to access the service. In one embodiment, the second user is an administrator of the system.

In certain embodiments, each of the first user and the second user has an identical privilege level to access the service.

In certain embodiments, the second user is a related person of the first user, and the service is not accessible to the second user.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
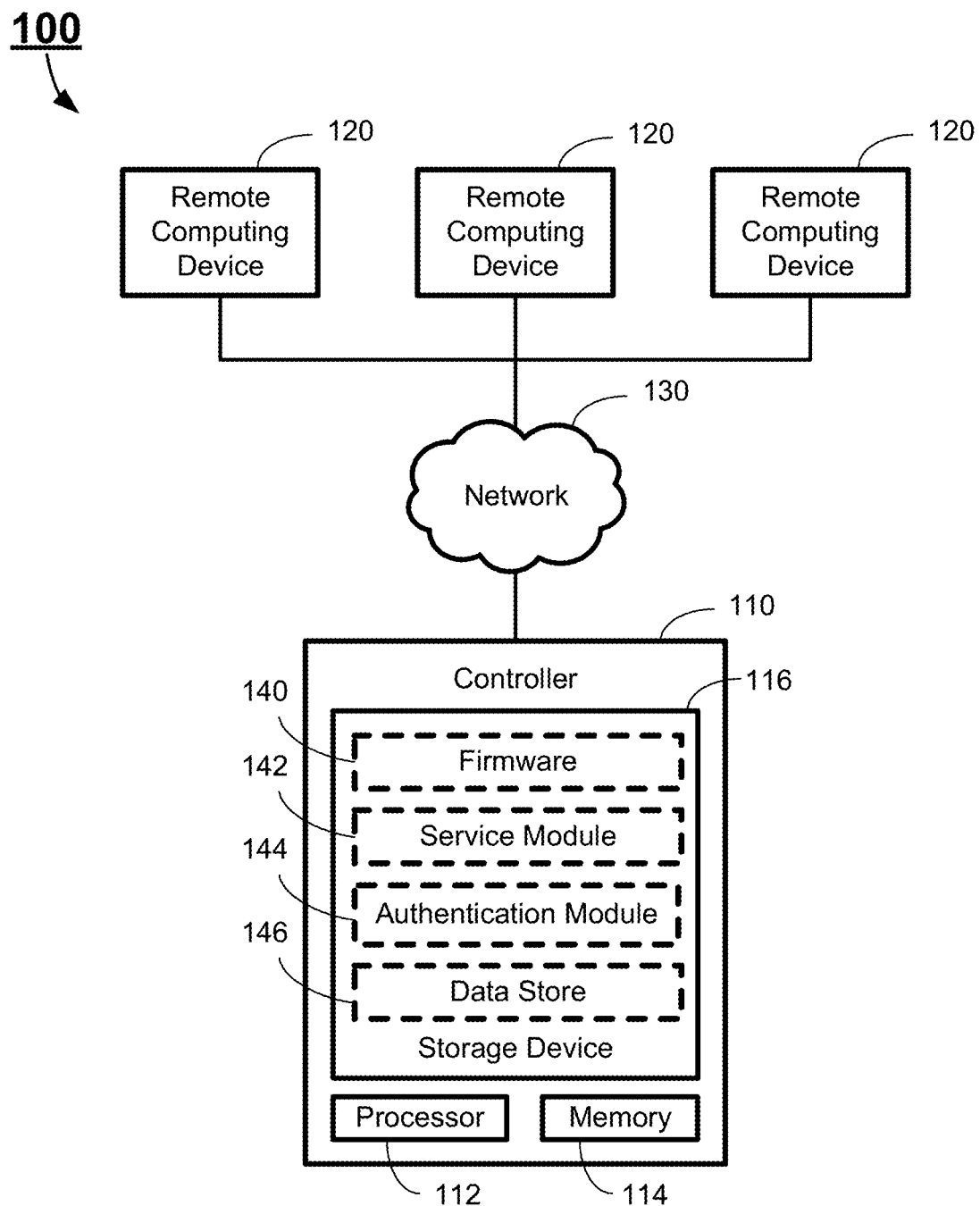
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for performing twin factor authentication on a controller, which can be a BMC. Unlike the traditional two-factor authentication process which limits the authentication to only one user, the two factor authentication involves multiple users with two or more different security clearances, including the actual user to access the service on the controller and at least one other user. In this case, security clearance from the actual user requesting authentication and from the other user are both required to successfully authenticate actual user to access the service being provided on the controller.

FIG. 1 schematically depicts an exemplary system according to certain embodiments of the present disclosure. As shown in FIG. 1, the system 100 includes a controller 110, which is specifically configured to provide at least one service. Any user that attempts to access the service on the controller 110 must pass the twin factor authentication process in order to access the service. Optionally, the system 100 may further include one or more remote computing devices 120, which are communicatively connected to the controller 110 via a network 130, such that a user may remotely access the controller 110 through any one of the remote computing devices 120. For example, a user at one of the remote computing devices 120 may access a certain service provided on the controller 110. In certain embodiments, the network 130 may be a wired or wireless network, and may be of various forms. Examples of the network 130 may include, but is not limited to, a local area network (LAN), a wide area network (WAN) including the Internet, or any other type of networks.

The controller 110 is a specialized microcontroller configured to provide the service to the users. In certain embodiments, the controller 110 may be a BMC used for baseboard management purposes. Alternatively, the controller 110 may be a management controller for other purposes, such as chassis management, rack management, virtual machine management, backplane or enclosure management, or other type of purposes. In certain embodiments, examples of the controller 110 may include a microcontroller based controller, a complex programmable logic device (CPLD) based controller, a field-programmable gate array (FPGA) based controller, or any combination thereof.

As shown in FIG. 1, the controller 110 includes a processor 112, a memory 114, and a storage device 116. Further, the controller 110 may include other hardware components and software components (not shown) to perform its corresponding tasks. For example, the controller 110 may include a network interface, such as a network interface card (NIC), which is used to connect the controller 110 to the network 130. Other examples of these hardware and software components of the controller 110 may include, but not limited to, other required memory, interfaces, buses, Input/Output (I/O) modules and peripheral devices.

The processor 112 is the processing core of the controller 110, configured to control operation of the controller 110. In certain embodiments, the processor 112 may execute any computer executable code or instructions, such as the firmware 140, the service module 142 and the authentication module 144, or other applications and instructions of the controller 110. In certain embodiments, the management controller 110 may run on more than one processor, such as two processors, four processors, eight processors, or any suitable number of processors.

The memory 114 can be a volatile memory, such as the random-access memory (RAM), for storing the data and information during the operation of the controller 110. In certain embodiments, the memory 114 may be a volatile memory array. In certain embodiments, the controller 110 may run on more than one memory 114.

The storage device 116 is a non-volatile data storage media for storing computer executable code or instructions for performing the operation of the controller 110. In certain embodiments, the computer executable code or instructions of the controller 110 may be implemented as one or more application programs or modules. Examples of the storage device 116 may include non-volatile memory such as flash memory, non-volatile random-access memory (NVRAM), memory cards, USB drives, hard drives, floppy disks, optical drives, or any other types of data storage devices. In certain embodiments, the controller 110 may have multiple storage devices 116, which may be identical storage devices or different types of storage devices, and the firmware 140, the service module 142, the authentication module 144, the data store 146, and other applications or data of the controller 110 may be stored in one or more of the storage devices 116 of the controller 110.

As shown in FIG. 1, the applications and data stored in the storage device 116 include the firmware 140, the service module 142, the authentication module 144, and the data store 146. As discussed above, each of the firmware 140, the service module 142, the authentication module 144, and the data store 146 may be formed by the computer executable code or instructions executable at the processor 112. In certain embodiments, each of the firmware 140, the service module 142, the authentication module 144, and the data store 146 may further include sub-modules. Alternatively, in certain embodiments, some or all of the firmware 140, the service module 142, the authentication module 144, and the data store 146 may be combined to form a single module. In certain embodiments, the storage device 116 may store other applications independent from the firmware 140, the service module 142, the authentication module 144, and the data store 146.

The firmware 140 stored in the storage device 116 includes the computer executable code that may be executed at the processor 112 to enable the operations of the controller 110. In certain embodiments, the firmware 140 may include one or more modules or software components that may be executed independently. In certain embodiments, the service module 142, the authentication module 144, and the data store 146 may be a part of the firmware 140. In certain embodiments, each of the service module 142, the authentication module 144, and the data store 146 may respectively be a separate software module independent from the firmware 140.

The service module 142 is a software application configured to provide a corresponding service of the controller 110. In certain embodiments, the controller 110 may include multiple service modules 142 to provide various different services. Examples of the services being provided may include, without being limited to, the web server service, the Intelligent Platform Management Interface (IPMI) service, the media redirection service, keyboard-mouse-video (KVM) redirection service, other any other types of services.

The authentication module 144 is a software application configured to provide the twin factor authentication process for users who attempt to access the service provided by the service module 142. In certain embodiments, the authentication module 144 may be a part of the service module 142. Alternatively, in certain embodiments, the authentication module 144 may be independent from the service module 142, allowing multiple different services to share the same authentication process.

The data store 146 is a database for storing the data for the twin factor authentication process and other necessary data of the firmware 140. In certain embodiments, the data stored in the data store 154 may include, without being limited to, information of the users to access the services that may be used for the twin factor authentication process.

Each of the remote computing devices 120 is a computing device being communicatively connected to the controller 110 via the network 130. In certain embodiments, the controller 110 may function as a server, and each of the remote computing devices 120 may function as a client, forming a client-server system. In certain embodiments, each of the computing devices 120 may be a different type of computing device from one another. Examples of the remote computing devices 120 may include, without being limited to, desktop computers, laptop computers, tablet computers, smartphones, or any other types of computing devices.

In certain embodiments, the twin factor authentication process involves multiple users, including a first user who attempts to access a service provided on the controller 110, and a second user who does not access the service, but merely functions as the other part of the twin factor authentication process. In certain embodiments, each of the first user and the second user may have access to one of the remote computing devices 120, such that the first user may be in communication with the controller 110 via the network 130 to perform the twin factor authentication process in order to access the service, and the second user may be in communication with the controller 110 to perform the twin factor authentication process for the first user. In this case, for a specific first user, the information of the first user to access a corresponding service may include the information of the first user and a second user corresponding to the first user.

Figure 2:
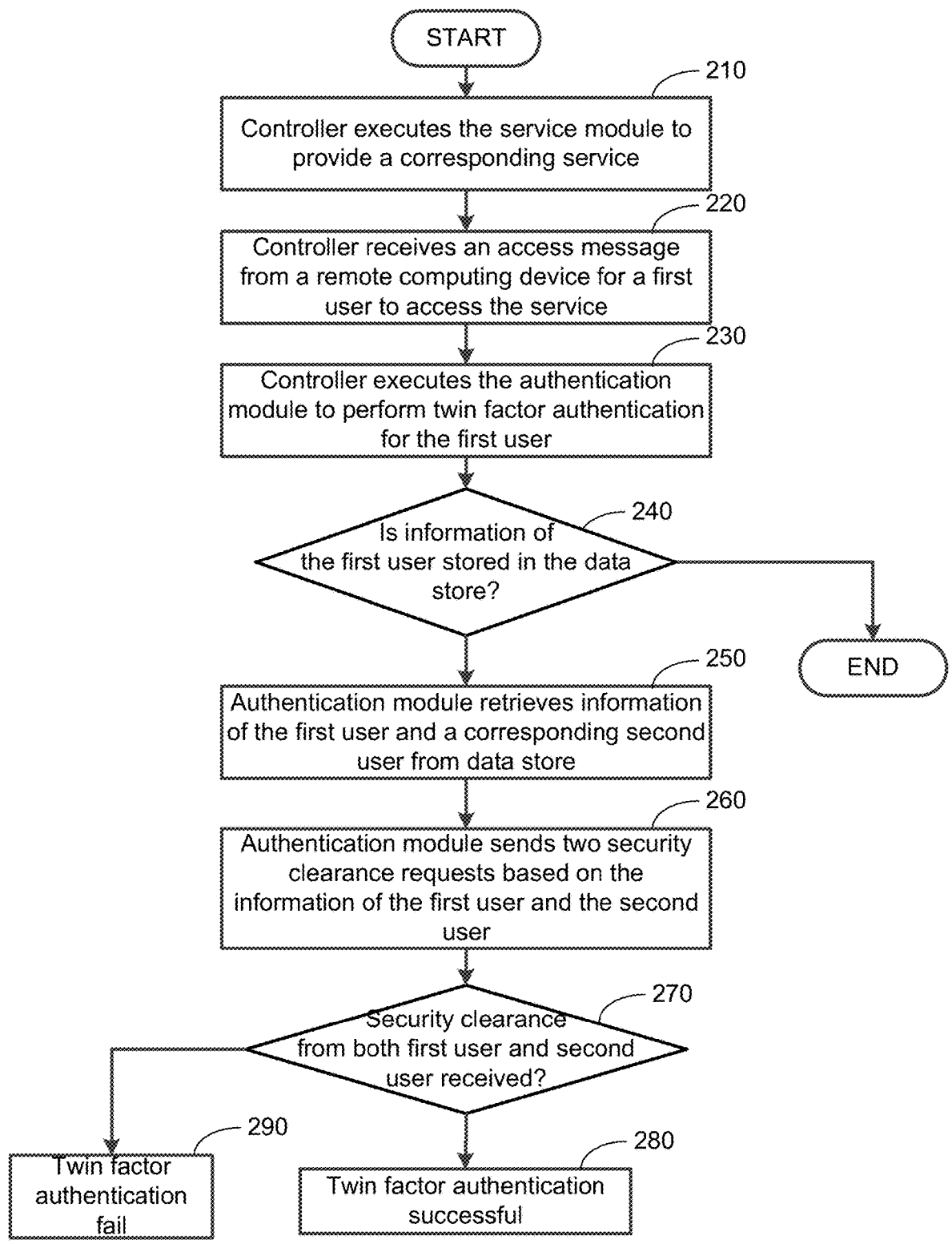
FIG. 2 depicts a flowchart of the twin factor authentication according to certain embodiments of the present disclosure.

FIG. 2 depicts a flowchart of the twin factor authentication according to certain embodiments of the present disclosure. In certain embodiments, the method as shown in FIG. 2 may be implemented by a system as shown in FIG. 1 for performing the twin factor authentication process on a controller 110 for a first user. In certain embodiments, the service being accessed by the first user may be implemented by the service module 142 of the controller 110 of the system, and the method may be implemented by the authentication module 144 of the controller 110 of the system 100 as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at procedure 210, the controller 110 may executes the service module 142 to provide a corresponding service. It should be noted that the controller 110 may simultaneously provide multiple services by executing multiple service modules 142, and each of the services may be respectively accessible by one or more users. When a first user operates a remote computing device 120 in an attempt to access a specific service provided on the controller 110, the first user may send an access message to the controller 110 to indicate the attempt to access the service. At procedure 220, the controller receives the access message from the remote computing device 120 for the first user to access the service. In certain embodiments, the access message includes information of the first user for the controller 110 to identify the first user.

In response to receiving the access message, at procedure 230, the controller 110 executes the authentication module 144 to perform the twin factor authentication process for the first user. At procedure 240, the authentication module 144 may search for the data store 146 based on the information of the first user in the access message received to determine whether the information of the first user exists in the data store 146. If there is no information of the first user, the process ends. On the other hand, if the information of the first user is found in the data store 146, at procedure 250, the authentication module 144 may retrieve the information of the first user and the corresponding second user from the data store, in order to send security clearance requests to the first user and the second user. At procedure 260, the authentication module 144 may send two security clearance requests respectively to the first user and the second user based on the information of the first user and the second user. In certain embodiments, the authentication module 144 may send two security clearance requests out simultaneously.

After sending out the two security clearance requests, the authentication module 144 may wait for the first user and second user to respond to the security clearance requests. At procedure 270, the authentication module 144 may periodically check whether security clearance from both the first user and the second user are received. If security clearance from both the first user and the second user are received, at procedure 280, the authentication module 144 may determine that the twin factor authentication process for the first user is successful (i.e., the first user is successfully authenticated to access the service), and the first user may be granted access to the service. On the other hand, if security clearance from both the first user and the second user are not received after a period of time, at procedure 290, the authentication module 144 may determine that the twin factor authentication process for the first user fails (i.e., the first user does not pass the authentication process to access the service), and the first user is denied access to the service.

In certain embodiments, the two security clearance requests include a first security clearance request for security clearance from the first user, and a second security clearance request for security clearance from the second user. In certain embodiments, different security clearance measurements may be used for the security clearance from the first user and from the second user. For example, security credential such as an account and password log-in process may be used as the security clearance for the first user, and an approval message or confirmation message may be used as the security clearance for the second user.

In certain embodiments, the authentication module 144 may send the first security clearance request back to the remote computing device 120 which the access message comes from, such that the first user at the remote computing device 120 may operate the remote computing device 120 to send the security clearance information to the controller 110. On the other hand, the authentication module 144 needs to obtain the information of the second user in order to send the second security clearance request to the second user. In certain embodiments, examples of the information of the second user may include, without being limited thereto, transmission information of the security clearance request to the second user that defines a transmission method and a destination for sending the second security clearance request to the second user, and security clearance information for security clearance from the second user that defines the security clearance measurement being used for the second user. For example, the transmission method for sending the security clearance request to the second user may involve using an email service, an instant messenger service, a cell phone short message service (SMS), or any other types of transmission services, and the destination for sending the security clearance request to the second user may be an email address, an instant messenger account, or a cell phone number, based on the type of transmission method.

In certain embodiments, different first users may share a same person as the corresponding second user. In this case, the second security clearance request being sent to the second user may include the information of the first user, and a security clearance instruction to the second user for approving the first user to access the service, such that the second user may recognize the identity of the first user.

Figure 3:
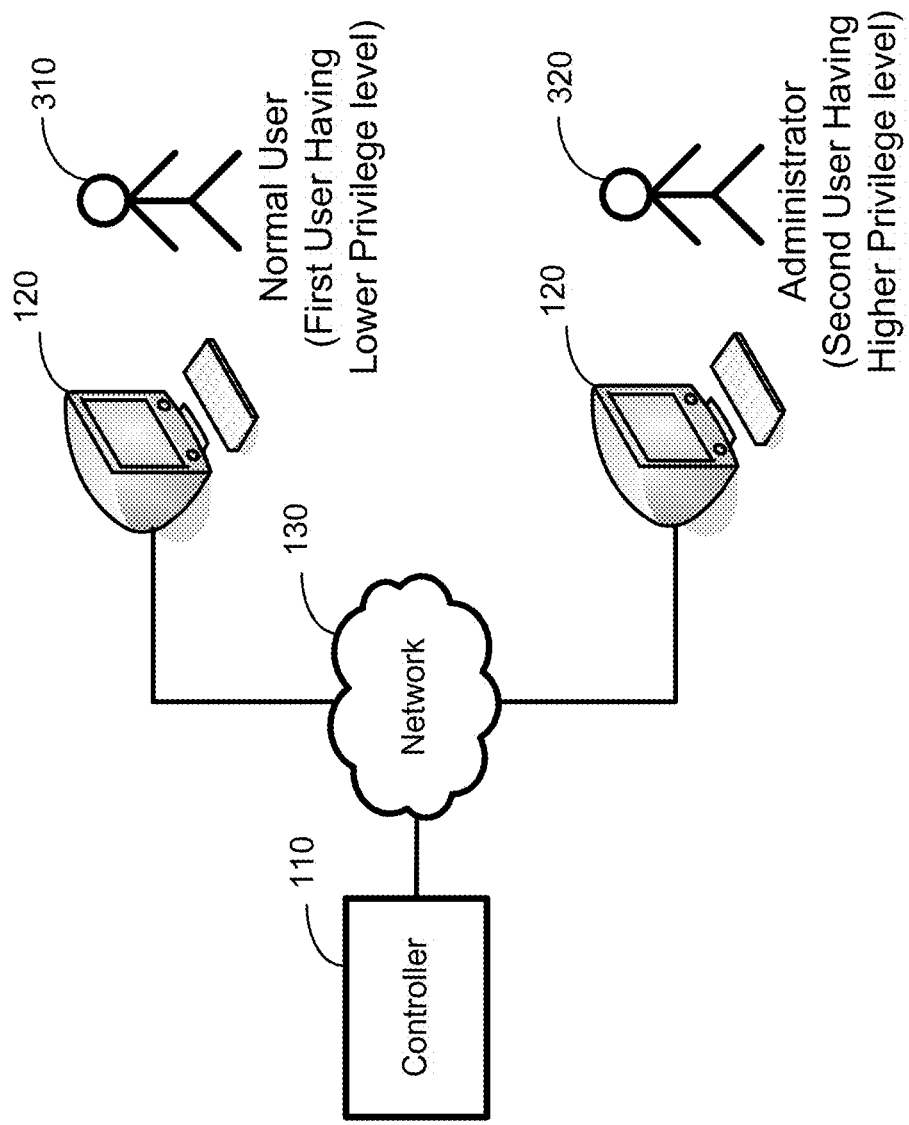
FIG. 3 depicts a flowchart of the twin factor authentication for a first user according to certain embodiments of the present disclosure.

FIG. 3 depicts a flowchart of the twin factor authentication for a first user according to certain embodiments of the present disclosure. Specifically, FIG. 3 shows an example where the first user 310 is a normal user having a lower privilege level to access the service provided on the controller 110, and the second user 320 is an administrator of the system, which has a higher privilege level to access the service provided on the controller 110. In other words, when the controller 110 receives the access message from the first user 310 (a normal user having a lower privilege level) to access the service, the twin factor authentication process requires authentication of the first user 310, as well as the approval from the second user 320 (an administrator having a higher privilege level).

Figure 4:
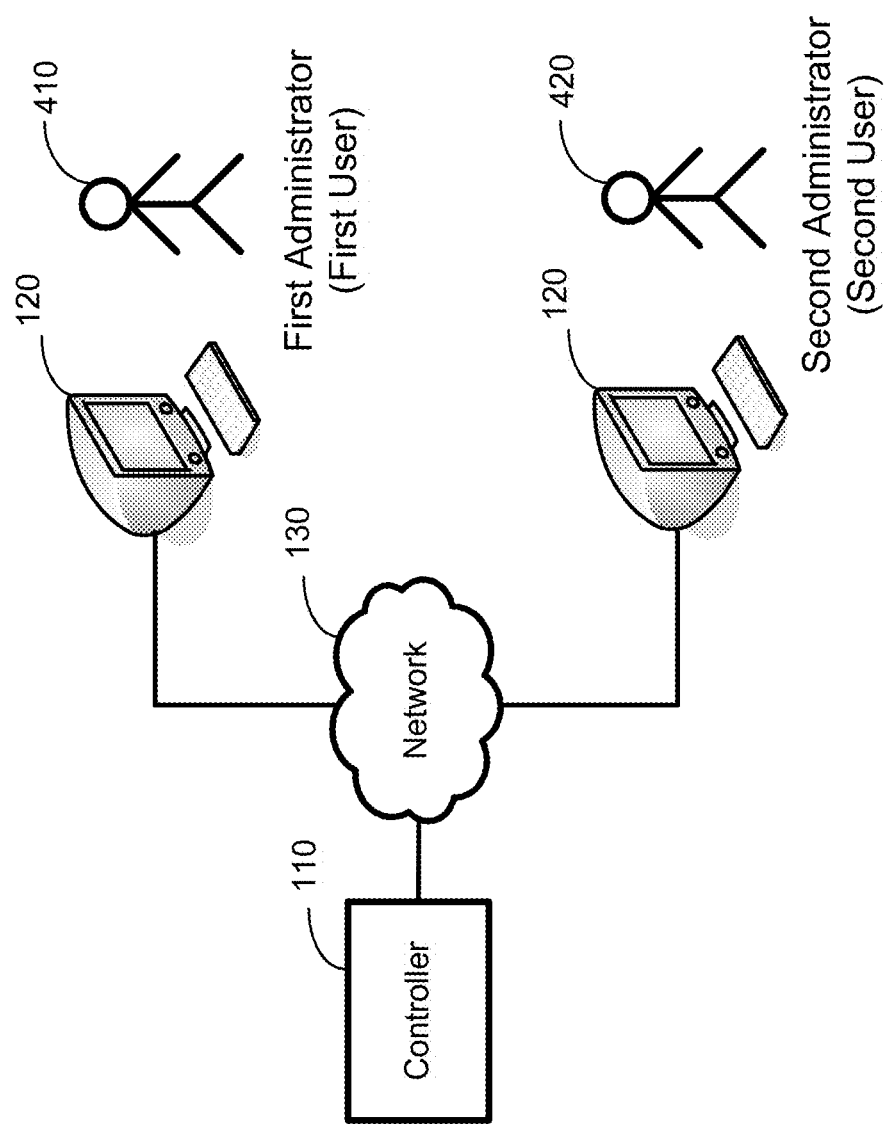
FIG. 4 depicts a flowchart of the twin factor authentication for a first user according to certain embodiments of the present disclosure.

FIG. 4 depicts a flowchart of the twin factor authentication for a first user according to certain embodiments of the present disclosure. Specifically, FIG. 4 shows an example where the system has two administrators with the same privilege level. In this case, the first user 410 is a first administrator of the system to access the service provided on the controller 110, and the second user 420 is a second administrator of the system not accessing the service. In other words, when the controller 110 receives the access message from the first user 410 (the first administrator) to access the service, the twin factor authentication process requires authentication of both administrators, including the first user 410 as well as the approval from the second user 420 (the second administrator).

Figure 5:
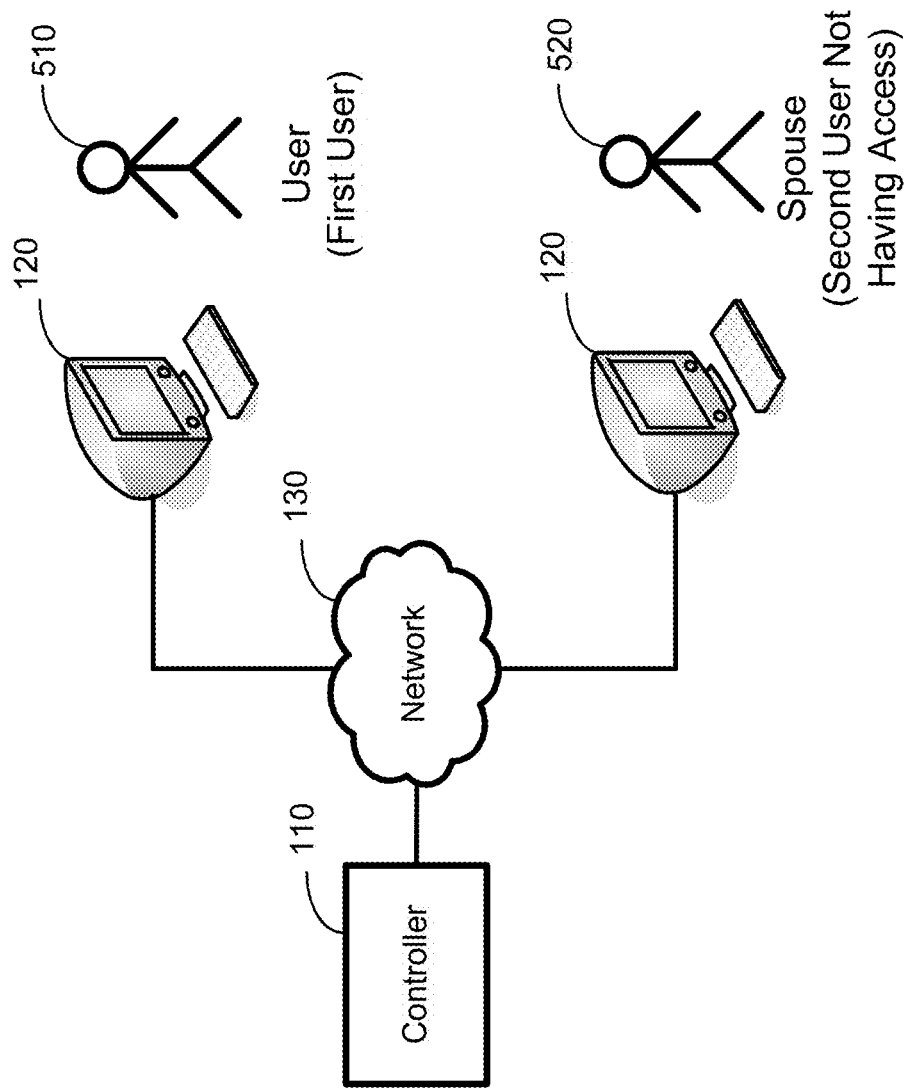
FIG. 5 depicts a flowchart of the twin factor authentication for a first user according to certain embodiments of the present disclosure.

FIG. 5 depicts a flowchart of the twin factor authentication for a first user according to certain embodiments of the present disclosure. Specifically, FIG. 5 shows an example where the first user 510 is an actual user to access the service provided on the controller 110, and the second user 520 is a spouse (or any other related person) of the first user 510. In other words, when the controller 110 receives the access message from the first user 510 (the actual user) to access the service, the twin factor authentication process requires authentication of the first user 510, as well as the approval from the second user 520 (the spouse or a related person of the first user 510). In this case, although being named as the "second user", the second user 520 merely functions as a related person to confirm the identity of the first user 510, and is not necessarily a "user" of the system. That is, the service provided on the controller 110 may not be accessible to the second user 520.

In the embodiments as described above, the twin factor authentication process is used to perform authentication for services provided on the controller 110, such as a BMC. In certain embodiments, however, the twin factor authentication process may also be applied to perform authentication on other computing devices.

In a further aspect, the present disclosure is related to a non-transitory computer readable medium storing computer executable code. The code, when executed at a processer of a controller, may perform the method as described above. In certain embodiments, the non-transitory computer readable medium may include, but not limited to, any physical or virtual storage media storing the firmware of the controller. In certain embodiments, the non-transitory computer readable medium may be implemented as the storage device 116 of the controller 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a controller comprising a processor and a memory storing computer executable code, wherein the computer executable code, when executed at the processor, is configured to:
   provide a service;
   receive an access message for a first user to access the service; and
   in response to the access message, perform twin factor authentication for the first user by:
   based on the access message, searching for information of the first user and an administrator of the system, wherein each of the first user and the administrator of the system has an identical administrative privilege level to access the service;
   sending two security clearance requests based on the information of the first user and the administrator of the system, wherein the two security clearance requests comprise a first security clearance request for security clearance from the first user, and a second security clearance request for security clearance from the administrator of the system;
   periodically checking whether security clearance from both the first user and the administrator of the system are received; and
   determining the twin factor authentication for the first user to be successful only in response to receiving security clearance respectively from both the first user and the administrator of the system within a period of time.

2. The system of claim 1, wherein the controller is a baseboard management controller (BMC).

3. The system of claim 1, further comprising a computing device communicatively connected to the controller via a network, wherein the access message is received by the controller from the computing device.

4. The system of claim 1, wherein the second security clearance request comprises:

the information of the first user; and a security clearance instruction to the administrator for approving the first user to access the service.

5. The system of claim 1, wherein the information of the administrator comprises:

transmission information of the second security clearance request; and security clearance information for security clearance from the administrator.

6. The system of claim 5, wherein the transmission information of the second security clearance request defines a transmission method and a destination for sending the second security clearance request to the administrator.

7. The system of claim 6, wherein the transmission method for sending the second security clearance request to the administrator comprises:

an email service;

an instant messenger service; and a cell phone short message service (SMS).

8. A method for performing twin factor authentication, comprising:

providing a service on a controller;

receiving, by the controller, an access message for a first user to access the service; and in response to the access message, performing, by the controller, the twin factor authentication for the first user by:

based on the access message, searching for information of the first user and an administrator of a system comprising the controller, wherein each of the first user and the administrator of the system has an identical administrative privilege level to access the service;

sending two security clearance requests based on the information of the first user and the administrator of the system, wherein the two security clearance requests comprise a first security clearance request for security clearance from the first user, and a second security clearance request for security clearance from the administrator of the system; and periodically checking whether security clearance from both the first user and the administrator of the system are received;

wherein the twin factor authentication for the first user is successful only in response to receiving security clearance respectively from both the first user and the administrator of the system within a period of time.

9. The method of claim 8, wherein the controller is a baseboard management controller (BMC).

10. The method of claim 8, wherein the access message is received by the controller from a computing device communicatively connected to the controller via a network.

11. The method of claim 8, wherein the second security clearance request comprises:

the information of the first user; and a security clearance instruction to the administrator for approving the first user to access the service.

12. A non-transitory computer readable medium storing computer executable code, wherein the computer executable code, when executed at a processor of a controller, is configured to:

provide a service;

receive an access message for a first user to access the service;

in response to the access message, perform twin factor authentication for the first user by:

based on the access message, searching for information of the first user and an administrator of a system comprising the controller, wherein each of the first user and the administrator of the system has an identical administrative privilege level to access the service;

sending two security clearance requests based on the information of the first user and the administrator of the system, wherein the two security clearance requests comprise a first security clearance request for security clearance from the first user, and a second security clearance request for security clearance from the administrator of the system;

periodically checking whether security clearance from both the first user and the administrator of the system are received; and determining the twin factor authentication for the first user to be successful only in response to receiving security clearance respectively from both the first user and the administrator of the system within a period of time.

13. The non-transitory computer readable medium of claim 12, wherein the controller is a baseboard management controller (BMC).

14. The non-transitory computer readable medium of claim 12, wherein the second security clearance request comprises:

the information of the first user; and a security clearance instruction to the administrator for approving the first user to access the service.

* * * * *